(12) United States Patent
Trocki et al.

(10) Patent No.: US 9,802,257 B2
(45) Date of Patent: Oct. 31, 2017

(54) CHUCK FOR HOLDING PRECISION COMPONENTS

(71) Applicant: Cummins Inc., Columbus, IN (US)

(72) Inventors: Marian Trocki, Columbus, IN (US); Sam Lawson, Columbus, IN (US)

(73) Assignee: Cummins Inc., Columbus, IN (US)

( * ) Notice: Subject to any disclaimer, the term of this patent is extended or adjusted under 35 U.S.C. 154(b) by 40 days.

(21) Appl. No.: 14/645,995

(22) Filed: Mar. 12, 2015

(65) Prior Publication Data

US 2015/0183030 A1 Jul. 2, 2015

Related U.S. Application Data

(63) Continuation-in-part of application No. 12/939,158, filed on Nov. 3, 2010, now abandoned.
(Continued)

(51) Int. Cl.
*B23B 31/30* (2006.01)
*B23B 31/18* (2006.01)

(52) U.S. Cl.
CPC ............ *B23B 31/302* (2013.01); *B23B 31/18* (2013.01); *B23B 2231/34* (2013.01);
(Continued)

(58) Field of Classification Search
CPC ....... B23B 31/18; B23B 31/30; B23B 31/302; B23B 31/1261; B23B 31/1276;
(Continued)

(56) References Cited

U.S. PATENT DOCUMENTS 603,825 A * 5/1898 Barber .................... B23B 31/18
279/37
624,225 A * 5/1899 Larkin .................... B23B 31/18
223/24
(Continued)

FOREIGN PATENT DOCUMENTS

DE 3512890 A1 * 10/1986 ........... B23B 31/261
DE 3813670 A1 * 11/1989 ........... B23B 31/261

OTHER PUBLICATIONS

Machine translation of description of German patent document, DE3512890A1, "Device for clamping deep-drilling tools for automatic tool change", Nagel, P. et al., Oct. 1986.*
(Continued)

*Primary Examiner* — Eric A Gates
*Assistant Examiner* — Chwen-Wei Su
(74) *Attorney, Agent, or Firm* — Faegre Baker Daniels LLP

(57) ABSTRACT

A chuck assembly comprising a mandrel portion including an extending member sized and shaped to hold a workpiece; and a piston including a bore receiving the extending member, the piston mounted for supported movement on and relative to the extending member, the piston moving between a first position and a second position, the first position providing for insertion and removal of the workpiece to and from the extending member, the second position causing gripping force to be applied to the workpiece in at least two locations that are spaced longitudinally along the workpiece to inhibit relative movement between the mandrel and the workpiece.

20 Claims, 12 Drawing Sheets

Related U.S. Application Data

(60) Provisional application No. 61/257,615, filed on Nov. 3, 2009.

(52) U.S. Cl.
CPC .... *Y10T 279/1045* (2015.01); *Y10T 279/1095* (2015.01); *Y10T 279/1291* (2015.01); *Y10T 279/17231* (2015.01); *Y10T 279/185* (2015.01); *Y10T 279/29* (2015.01)

(58) Field of Classification Search
CPC ............. B23B 31/261; Y10T 279/1274; Y10T 279/1291; Y10T 279/17231; Y10T 279/185; Y10T 279/12; Y10T 279/17256; Y10T 279/1095; Y10T 279/1045; Y10T 279/1041; Y10T 279/1037; Y10T 279/182; Y10T 279/1008; Y10T 279/1004; Y10T 279/29
See application file for complete search history.

(56) References Cited

U.S. PATENT DOCUMENTS

| | | | |
|---|---|---|---|
| 1,978,611 A * | 10/1934 | Styles | B23B 31/18 279/106 |
| 3,690,687 A | 9/1972 | Moe | |
| 4,699,388 A | 10/1987 | Sproccati et al. | |
| 4,802,680 A | 2/1989 | Fuchs | |
| 4,867,463 A | 9/1989 | Hopf | |
| 5,295,700 A | 3/1994 | Crews et al. | |
| 5,312,118 A * | 5/1994 | Wakotsch | G01M 1/045 269/48.1 |
| 5,899,464 A | 5/1999 | DeFeo | |
| 6,213,478 B1 | 4/2001 | Nishikawa | |
| RE37,397 E | 10/2001 | Lloyd | |
| 6,575,477 B2 | 6/2003 | Humphrey et al. | |
| 6,629,697 B1 | 10/2003 | Asai et al. | |
| 6,824,142 B2 | 11/2004 | Meissner et al. | |
| 6,923,451 B2 | 8/2005 | Taguchi et al. | |
| 7,320,568 B2 | 1/2008 | Matsumoto et al. | |
| 7,420,298 B2 | 9/2008 | Botos et al. | |
| 8,403,338 B2 * | 3/2013 | Hangleiter | B23B 31/265 279/35 |
| 2008/0018061 A1 | 1/2008 | Haimer et al. | |
| 2008/0224423 A1 | 9/2008 | Hangleiter | |

OTHER PUBLICATIONS

Machine translation of description of German patent document, DE3813670A1, "Coupling between two machine parts", Helmut, H. et al., Nov. 1989.*

* cited by examiner

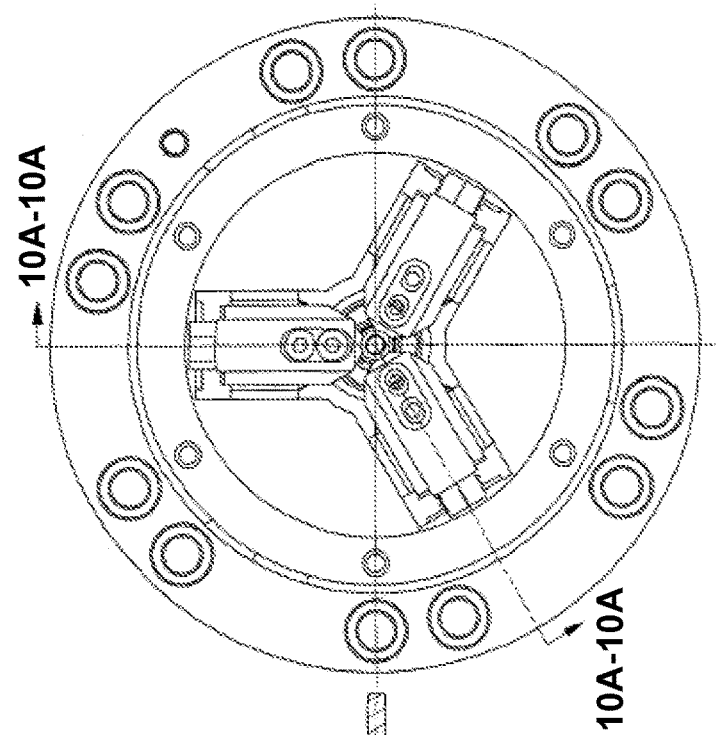
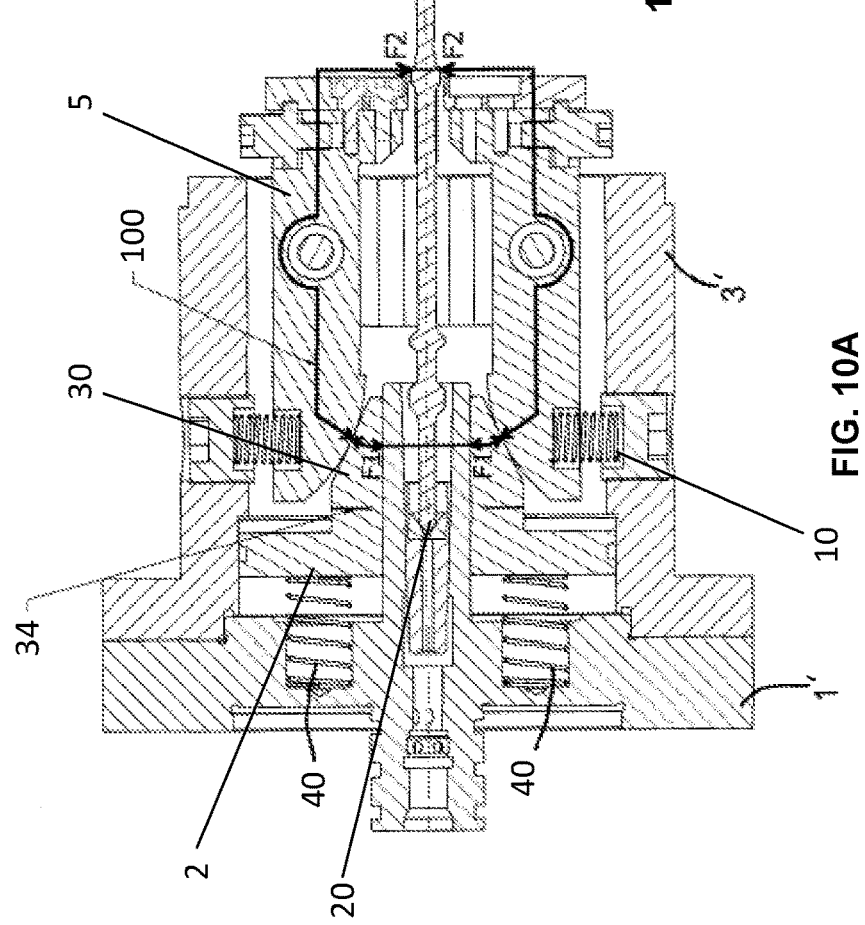
FIG. 10A
FIG. 10B

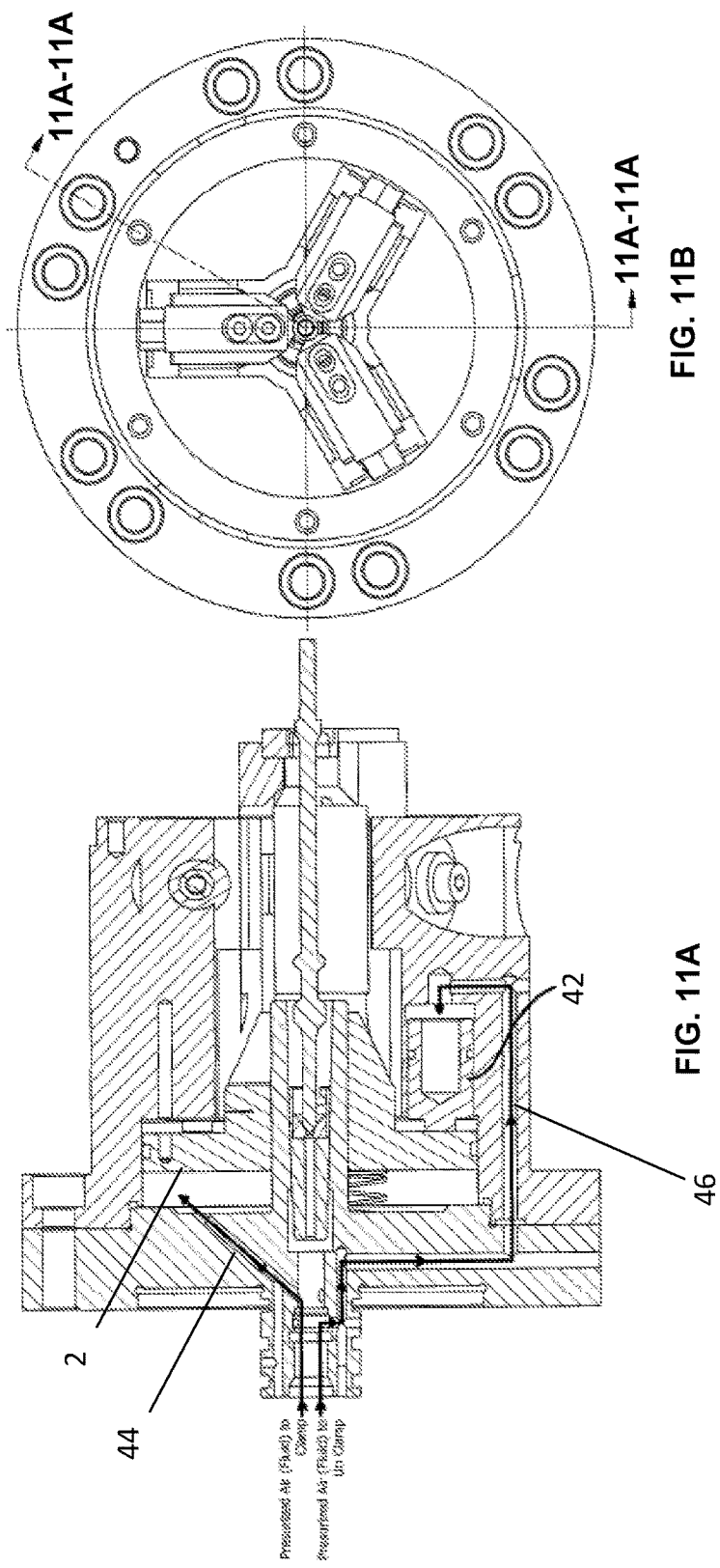

CHUCK FOR HOLDING PRECISION COMPONENTS

CROSS REFERENCE TO RELATED APPLICATIONS

This application is a continuation-in-part of U.S. patent application Ser. No. 12/939,158, entitled CHUCK FOR HOLDING PRECISION COMPONENTS filed on Nov. 3, 2010, which claims priority from U.S. Provisional Application No. 61/257,615, filed Nov. 3, 2009, the entire disclosures of which are hereby expressly incorporated herein by reference.

TECHNICAL FIELD

This invention relates to a chuck for holding components, and specifically to a chuck used to hold components in a machine for precision working of components.

BACKGROUND

Chucks are mechanisms removably hold and/or secure a part or tool. Some chucks operate by manipulation by the operator to clamp onto and secure and/or unsecure a part or tool. For example, a conventional three jaw chuck requires the operator to loosen the jaws to insert the item to be held and to tighten the jaws to clamp down on and secure the item. Other bit holders may automatically clamp onto and secure an item when the user inserts the item into the chuck, or require an action by the operator, such as twisting the chuck body by hand or using an external device, such as a key or other tool, to secure and/or unsecure an object to be held.

SUMMARY

According to a first embodiment, a chuck assembly is provided comprising a mandrel portion including an extending member sized and shaped to hold a workpiece; and a piston including a bore receiving the extending member, the piston mounted for supported movement on and relative to the extending member, the piston moving between a first position and a second position, the first position providing for insertion and removal of the workpiece to and from the extending member, the second position causing gripping force to be applied to the workpiece in at least two locations that are spaced longitudinally along the workpiece to inhibit relative movement between the mandrel and the workpiece.

According to another embodiment, an assembly for holding a workpiece is provided comprising a mandrel portion including an extending member; a piston including a bore receiving the extending member, the piston mounted for supported reciprocal movement on the extending member, the piston including plurality of tabs having internal and external surfaces, the tabs being able to deflect to bring the internal surfaces into engagement with the extending member; and a set of jaws mounted for pivotal movement, each jaw of the set of jaws including a surface positioned to receive force exerted by the external surfaces of the piston, wherein movement of said piston exerts force via the external surfaces of the piston and causes pivotal movement of said set of jaws.

According to yet another embodiment, an assembly for holding a workpiece is provided comprising a mandrel portion including an extending member; a piston including a plurality of tabs cooperating to define a bore receiving the extending member, the piston mounted for supported reciprocal movement on and relative to the extending member; a set of jaws mounted for pivotal movement, wherein movement of said piston causes pivotal movement of said set of jaws, wherein each jaw of the set of jaws includes a clamping surface operable to frictionally engage a workpiece placed within the chuck assembly, pivotal movement of said set of jaws altering an angle assumed by the clamping surface.

Other features, elements, characteristics and advantages of the present invention will become more apparent from the following detailed description of preferred embodiments of the present invention with reference to the attached drawings.

BRIEF DESCRIPTION OF THE DRAWINGS

FIGS. 10A and 10B show a cross section view of a second embodiment chuck assembly employing the piston of FIGS. 7A-D.

FIG. 11A and 11B another cross section view of the second embodiment chuck assembly of FIGS. 10A and 10B.

DETAILED DESCRIPTION

Figure 1:
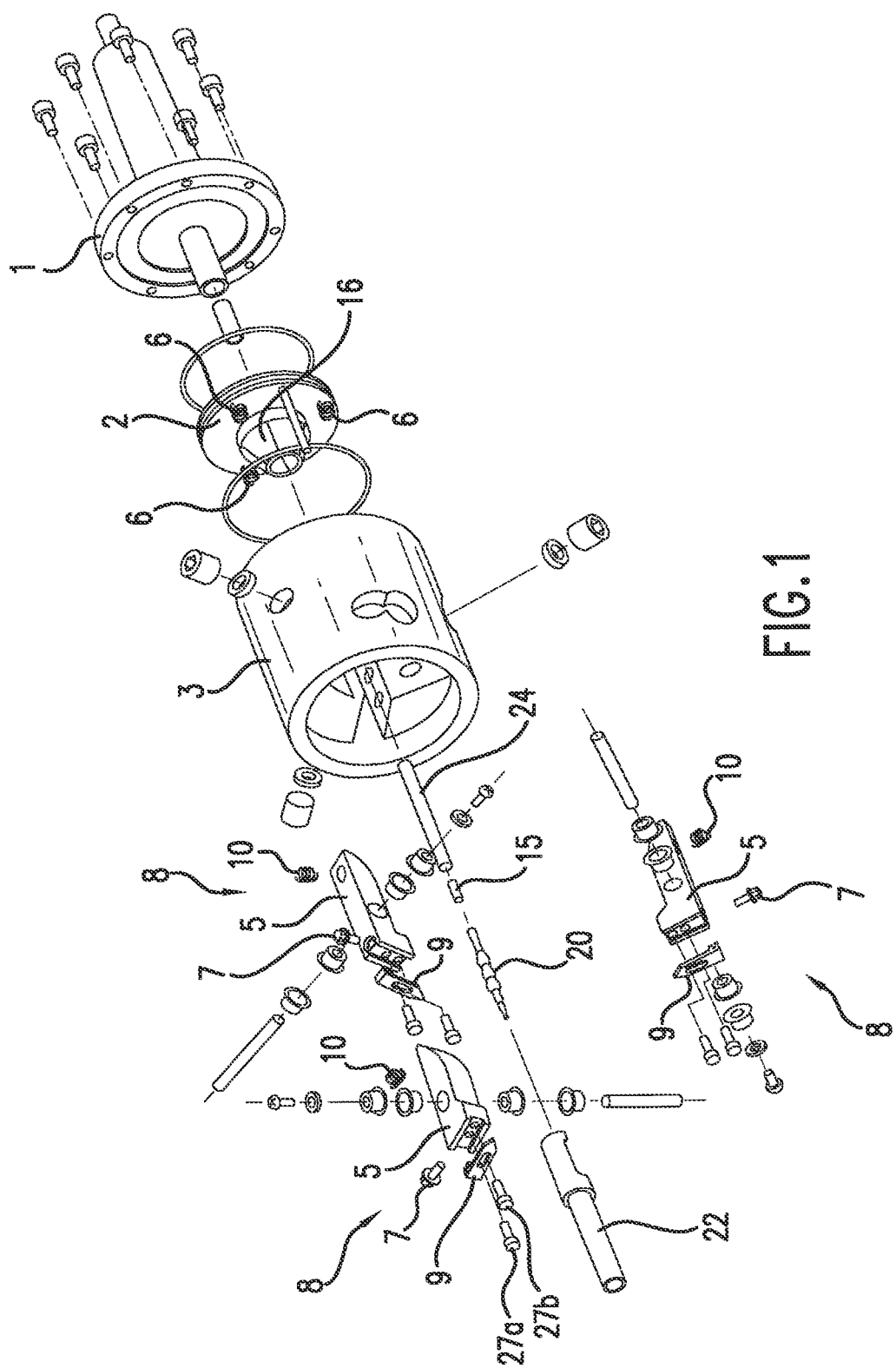
FIG. 1 is an exploded view of the chuck assembly according to an exemplary embodiment.
Figure 2:
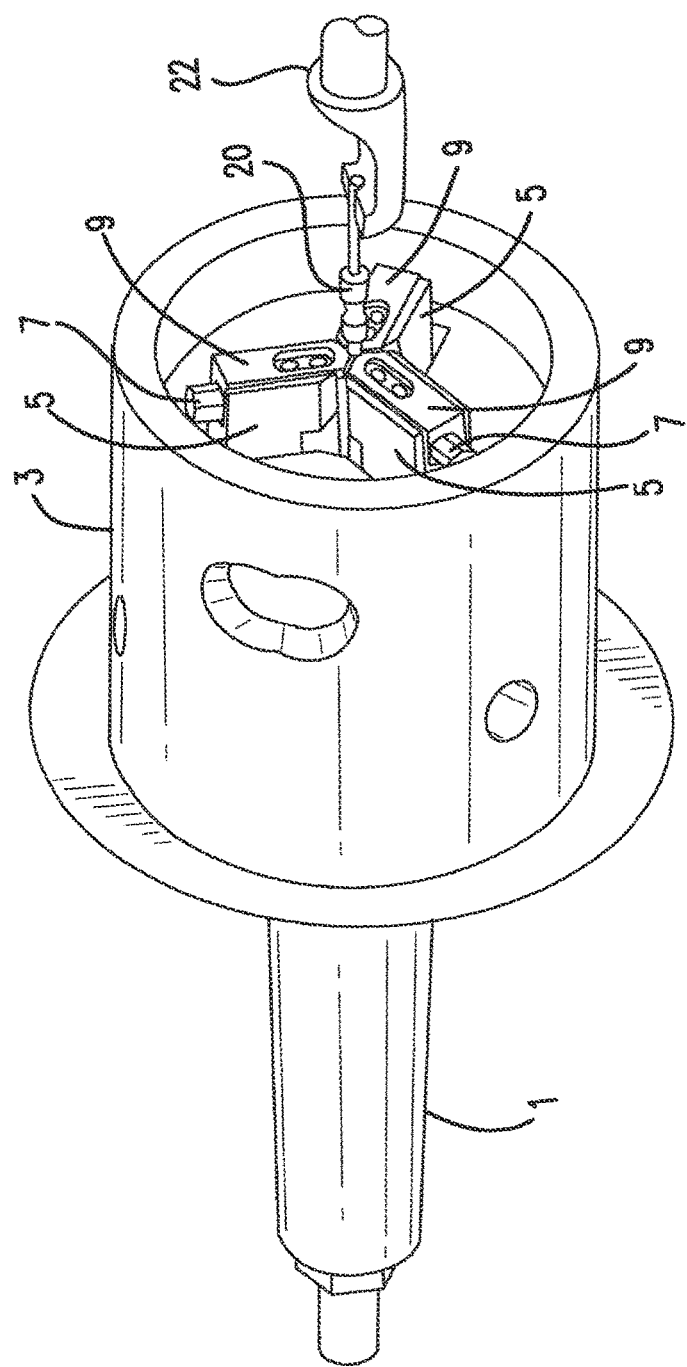
FIG. 2 is a perspective view of the chuck assembly.
Figure 3:
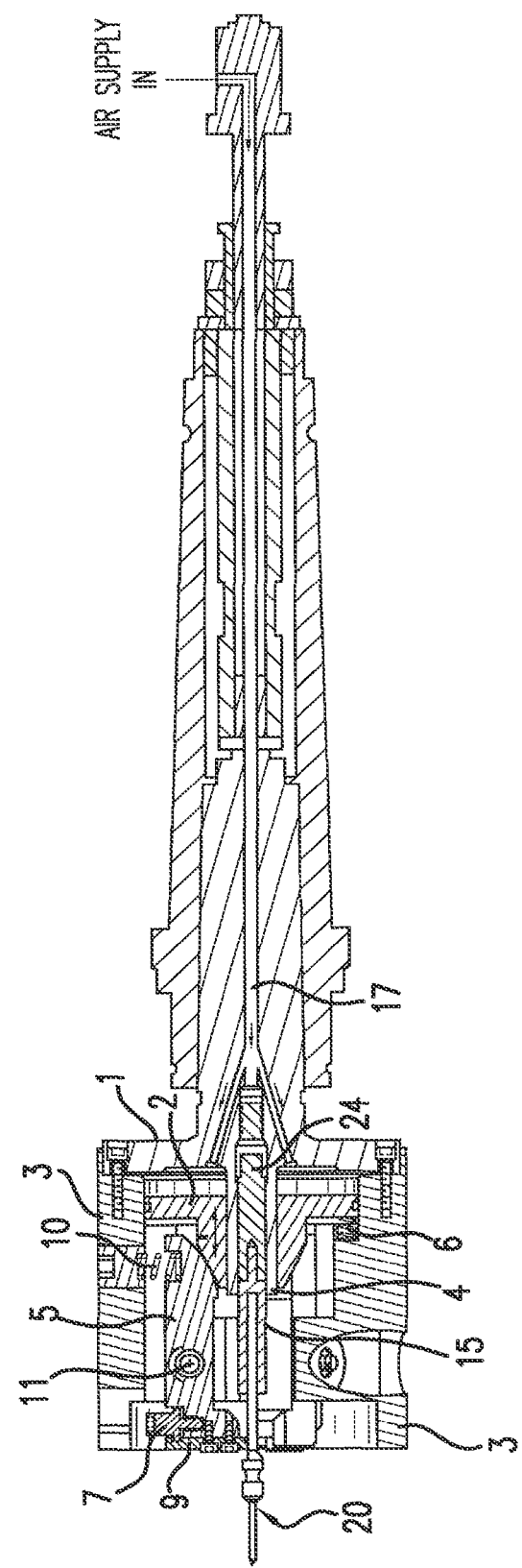
FIG. 3 is a cross-sectional view of the along the longitudinal axis of the chuck assembly.
Figure 4:
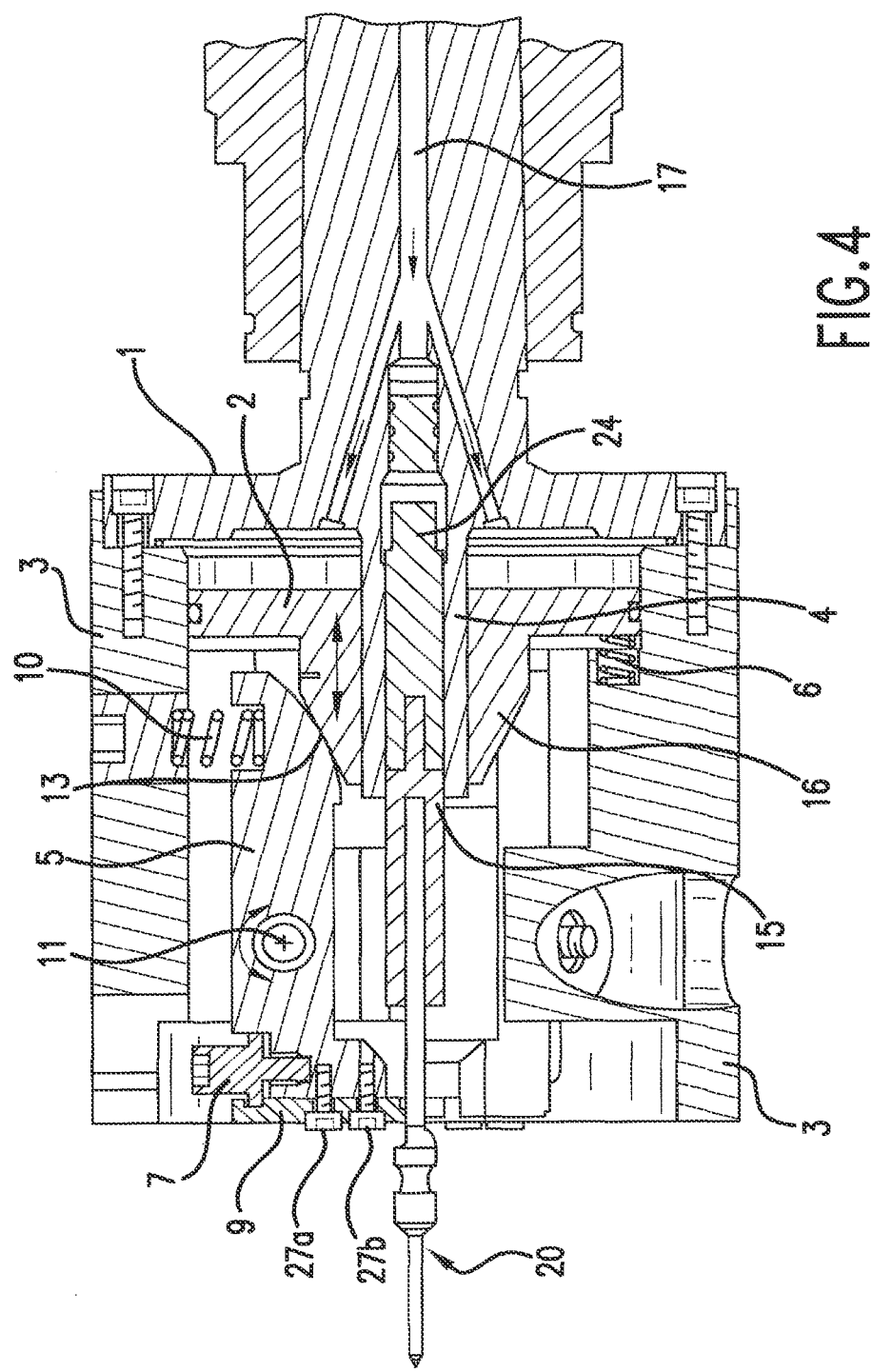
FIG. 4 is an enlarged cross-sectional view of a chuck housing end of the assembly shown in FIG. 3.
Figure 5:
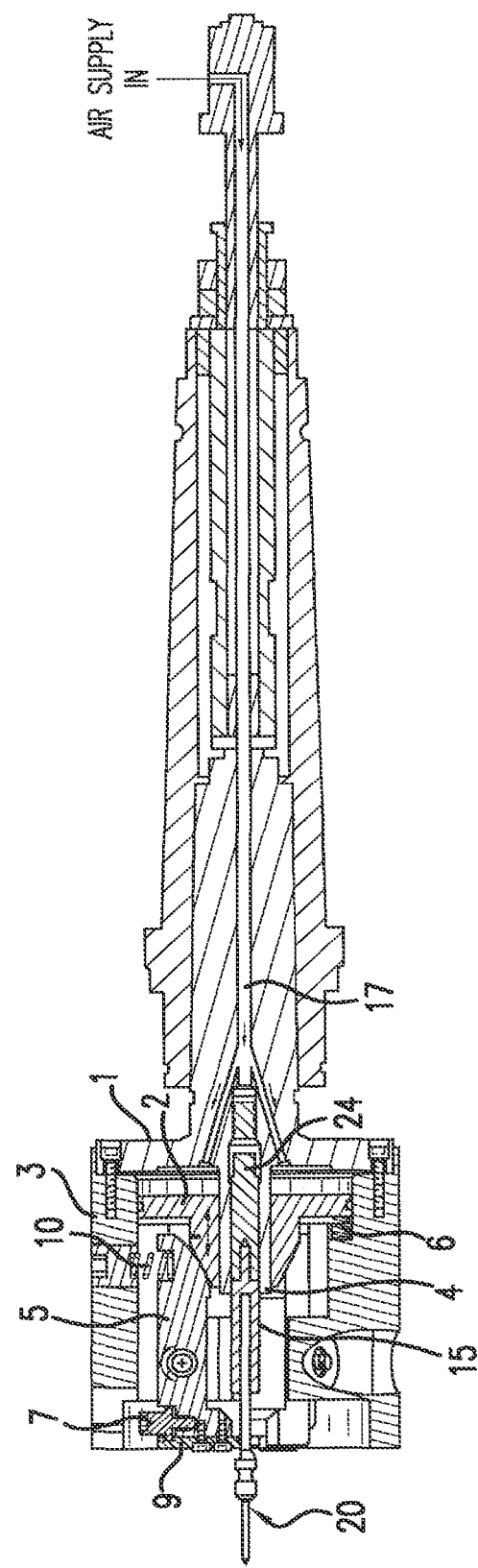
FIG. 5 is a cross-sectional view of a chuck assembly similar to FIG. 3.
Figure 6B:
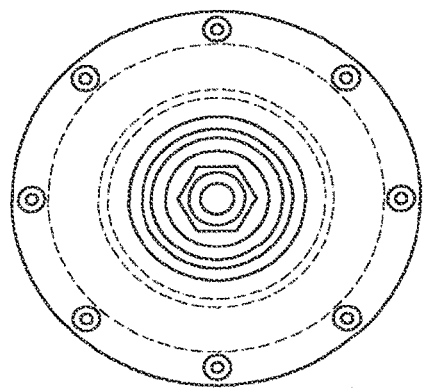
FIG. 6B is a rear view of the mandrel shown in FIG. 6A.
Figure 6D:
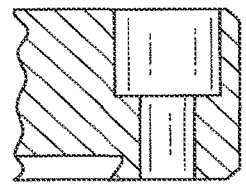
FIG. 6D is an enlarged view of the circled area of FIG. 6A.
Figure 6A:
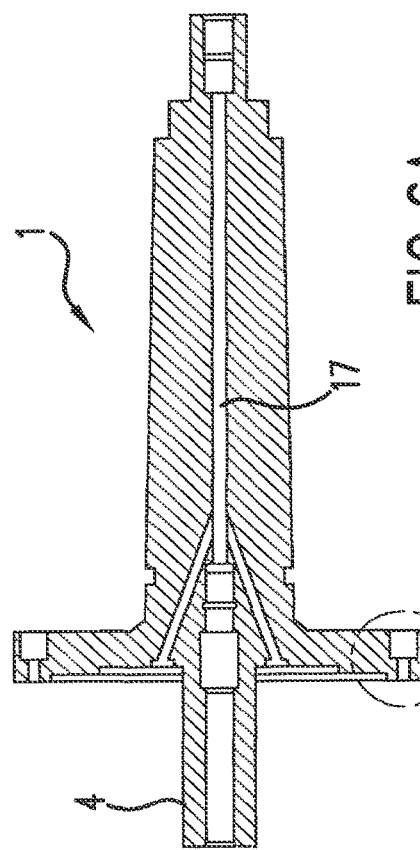
FIG. 6A is a cross section side view of a mandrel of a chuck assembly according to an exemplary embodiment.
Figure 6C:
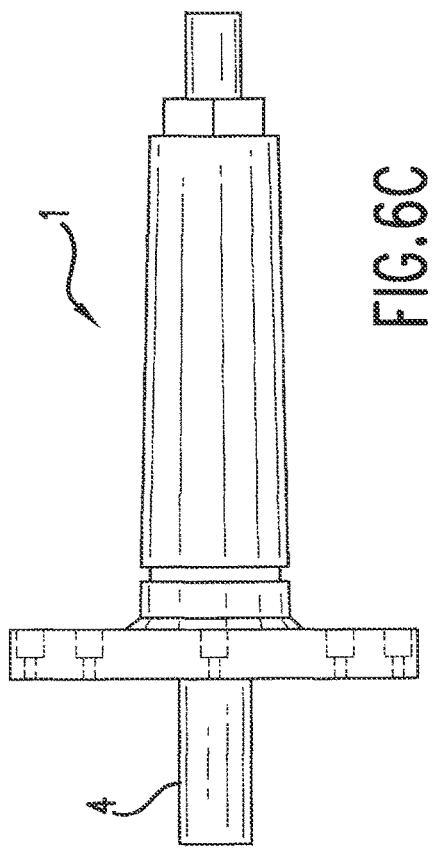
FIG. 6C is a side view of the mandrel shown in FIG. 6A.
Figure 7A:
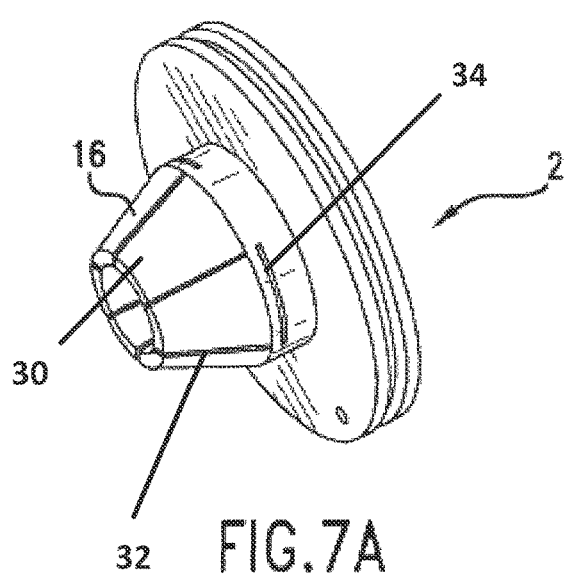
FIGS. 7A to 7D shows various views of a piston of a chuck assembly according to an exemplary embodiment.
Figure 7B:
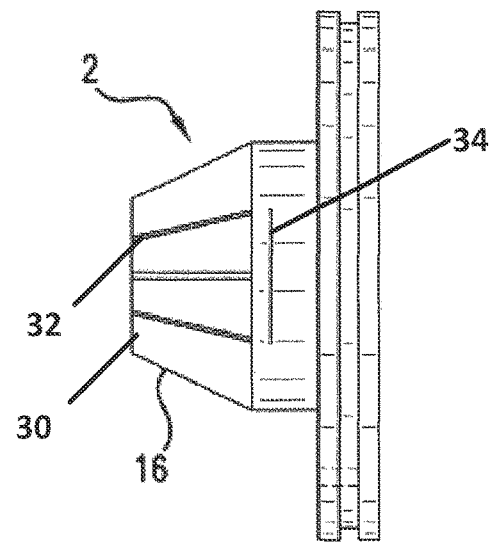
Figure 7C:
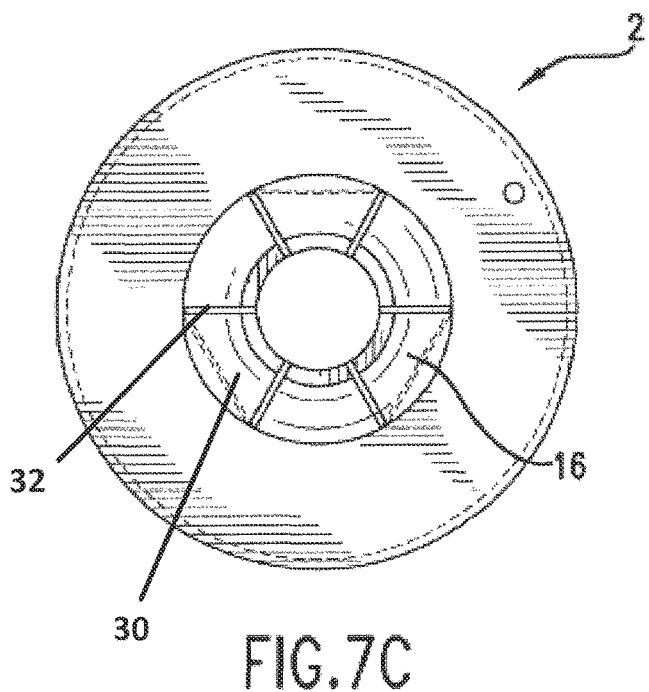
Figure 7D:
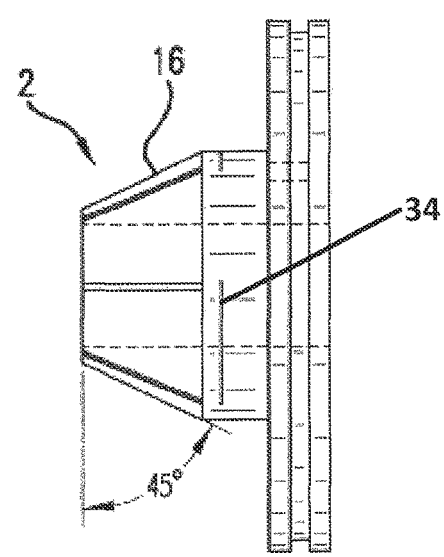
Figure 8A:
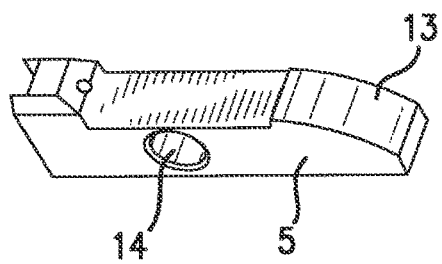
FIG. 8A is a perspective view of a jaw of a chuck assembly according to an exemplary embodiment.
Figure 8B:
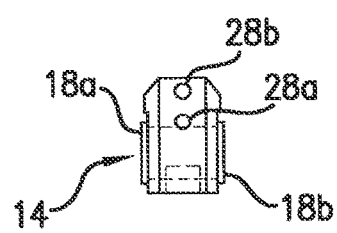
FIG. 8B is a top view of the jaw shown in FIG. 8A.
Figure 8C:
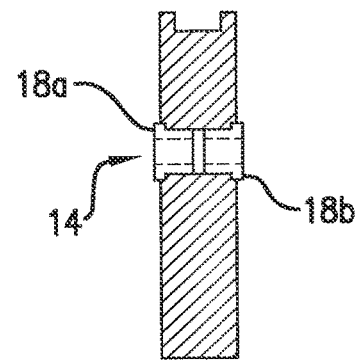
FIG. 8C is a cross section view of the jaw shown in FIG. 8A.
Figure 8D:
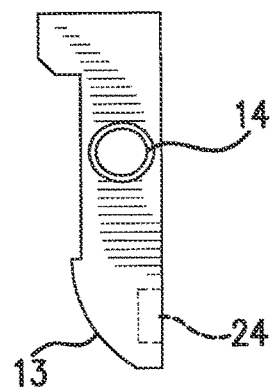
FIGS. 8D and 8F are side views of the jaw shown in FIG. 8A.
Figure 8E:
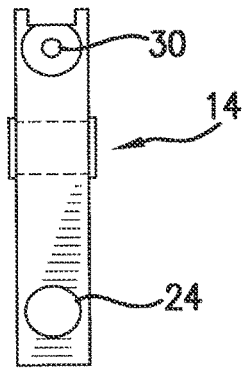
FIG. 8E is a rear view of the jaw shown in FIG. 8A.
Figure 8F:
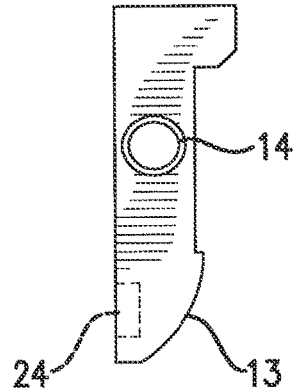
Figure 9A:
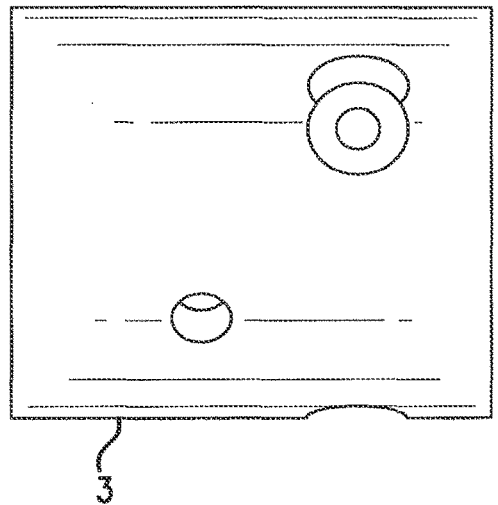
FIGS. 9A to 9F show various views of a housing of a chuck assembly according to an exemplary embodiment.
Figure 9B:
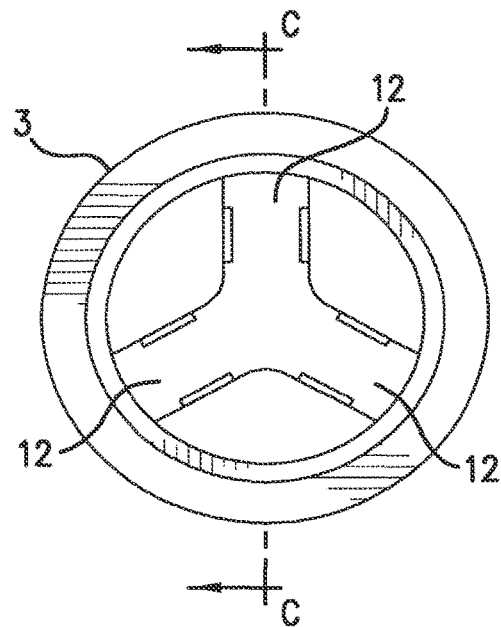
Figure 9C:
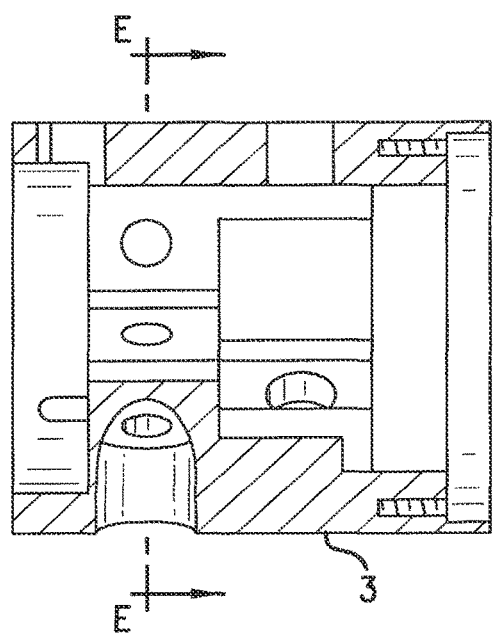
Figure 9D:
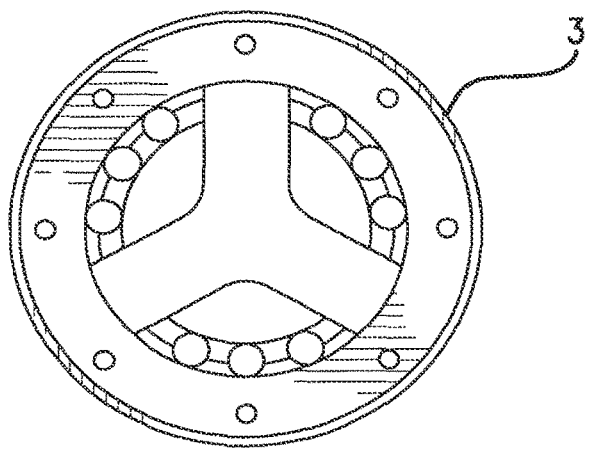
Figure 9E:
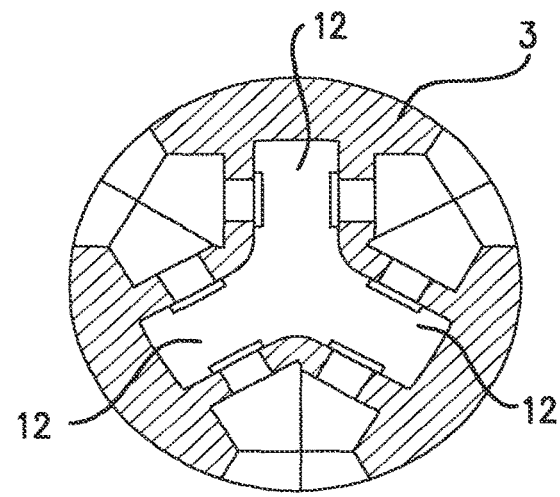
Figure 9F:
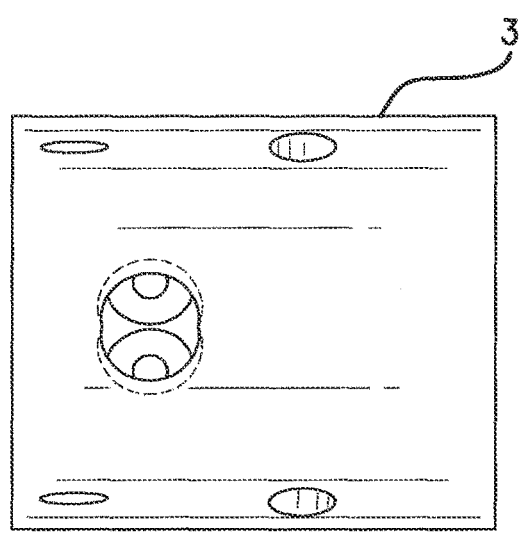

Finish grinding of some injection system components, i.e. injector plungers or needles, requires special work holding and clamping methods to achieve required roundness and end-to-end run out specifications. Some injector needles are quite long, e.g. greater than 130 mm, and small in diameter, e.g. diametral cross section of 4 mm. Needles often include other portions or diametral sections along its length having larger diameters, such as 6 mm and 8 mm. This needle configuration requires a chuck that can receive these extra long parts and have enough chuck jaw travel to accommodate the diametral differences of the different needle sections, and yet be accurate and repeatable to less than 0.005 mm when clamping work pieces.

There do not appear to be any standard off-the-shelf clamping devices that perform this work holding function sufficiently to satisfy the above-mentioned requirements.

The chuck of the present invention is specifically dedicated to provide proper work holding during needle grinding operations to achieve required roundness and run out specifications. The chuck of the present invention is designed to enable grinding of either end of the needle, also referred to as the needle valve element or plunger. The part to be machined can be simply turned around endwise if necessary. Conventional grinding operations require two distinct operations with different chucks for each end of the needle. The chuck change over between the two grinding operations was minimized and without any additional work holding.

Major features of the chuck of the present invention include enabling greater precision machining with accuracy and repeatability (run-outs) of less than 0.005 mm. In addition, the chuck accepts parts (needles) with large length to diameter (L/D) ratios, can hold parts up to 150 mm in length, and has a jaw that opens through a wide range, for example, 6 mm, i.e. a jaw opening of 3 to 9 mm, or 4 to 10 mm, etc. Conventional chucking devices of similar accuracy have an opening range of 0.2 mm.

The chuck of the present invention effectively holds small works, such as needle valve elements or plungers used in fuel injectors, thereby improving the extent, accuracy and precision of grinding throughout grinding operations.

Referring now to FIGS. 1-6, an embodiment of a the chuck includes a mandrel 1. As shown, the mandrel has a #5 Morse taper to fit a standard work head of the grinding machine, although the taper can alternatively be another size, such as a #4 taper, or a flange mounting may be used. Mandrel 1 also serves as a base mounting for all other chuck components.

The chuck also includes a chuck housing 3, a piston 2 positioned for sliding guided movement on an extension 4 formed on mandrel 1, and three jaws 5 positioned in, and mounted on, housing 3. Housing 3 functions as the main chuck body, mounts to the mandrel 1, and houses jaws 5. Piston 2 is preferably air actuated but can be actuated by pressurized oil. Piston 2 moves axially along the chuck and mandrel extension 4 between extended and retracted positions to provide motion for, or cause movement of, the chuck jaws 5. Movement of piston 2 in a forward axial direction toward the extended position away from mandrel 1 causes jaws 5 to close or move toward a closed position. Movement of piston 2 in a reverse axial direction away from mandrel 1 causes jaws 5 to open or move toward an open position. One or more piston return springs 6, positioned between the housing and a piston flange, biases the piston 2 toward the retracted position away from housing 3 thereby moving the piston 2 in a reverse direction when the air or oil pressure is shut off.

Jaws 5 are each pivotally mounted on a jaw retaining assembly 8 (bushings, spacers and/or pins), as shown in FIG. 1, to pivot in a radial plane extending radially from the centerline axis of the housing 3. Each jaw 5 pivots around a pivot axis 11 extending perpendicular to the radial plane so that a clamping end of each jaw 5 moves in a clamping direction toward the centerline axis of the housing 3 when piston 2 moves toward its extended position.

Referring now to the FIGS. 8A to 8F, which show more detailed views of an exemplary jaw 5, and FIGS. 9A to 9F, which show detailed views of an exemplary housing 3, the housing 3 includes three jaw slots 12 formed within the housing and spaced equally around the circumference of the interior of housing 3. Each jaw slot 12 is sized to receive and guide one of the jaws 5 during pivoting movement. Each jaw retaining assembly 8 (see also, FIG. 1) extends through the housing 3, a passage 14 formed in the respective jaw, and back into the housing 3 to pivotally mount and retain the jaw within the slot. Thus, jaws 5 can be mounted using precisely fitted bushings 18a, 18b to ensure stability and repeatability. Each jaw 5 also includes a driven end 13 having a curved inner surface for driven abutment or contact by a tapered portion 16 of a driving end of piston 2 (see, FIG. 4). Preferably the tapered portion is cone, or frusto-conically, shaped, for example, as shown in FIGS. 7A to 7D. Tapered portion 16 includes a plurality of tabs 30 that are formed via a plurality of gaps 32 formed in tapered portion 16. Piston 2 also includes a plurality of gaps 34 defined in cylindrical portion 36. Gaps 32, 34 allow tabs 30 to deflect or flex when force is applied that urges tabs 30 radially inward.

A jaw return spring 10 is mounted at the driven end in a retaining opening 24 of each jaw to bias the driven end of the jaw toward and into abutment with the driving end of piston 2, and thus biasing jaw 5 toward a retracted position around pivot axis 11.

A part stop 24 is replaceably positioned within a conical bore formed in the mandrel extension to provide a fixed stop against which the workpiece or part, i.e. injector needle element, is positioned when inserting the part into the chuck. A plurality of interchangeable part stops having different length can be provided.

A replaceable jaw insert 9 may be provided on the clamping end of each jaw 5 to accommodate different clamping diameters. Jaw inserts can be attached to the top portion of each jaw 5 using screws 27a, 27b in openings 28a, 28b (see, FIGS. 4 and 8B) and are designed for quick change over (and replacement) to accommodate different work pieces. A jaw insert adjuster 7, mounted adjacent each insert 9 at 30 (see, FIG. 8E), permits the position of each insert 9 to be adjusted radially to achieve required run outs. This is accomplished by the jaw inserter adjuster 7.

Piston 2 is matched to the mandrel extension or arbor with a minimal clearance to permit smooth sliding yet well supported reciprocal movement. Piston 2 is also designed to collapse onto the mandrel in full closed position to provide stability and repeatability. Controlled air leakage thru the piston/mandrel clearance can be provided to reduce or prevent debris from entering cylinder chamber and ensure free sliding motion.

Jaw insert adjuster 7 is a micro adjusting screw to enable zeroing of the radial run out of the work piece to a desired accuracy. A set up detail (spider, not shown) is also designed to fit jaws for jaw grinding under a clamped condition if so desired. The spider is a ring with dowel pins that can be inserted into inner mounting holes of the jaw inserts so the jaws can be closed (clamped) for grinding of jaw inserts. Precisely adjusted jaws 5 will provide radial run out accuracy of 0.005 mm (or better) while maintaining a large range of opening clearance/motion (8 mm diametral) to accommodate different part geometries.

In use, the work piece or part 20 is inserted into the chuck against part stop 24. A part guide 15 may be used as a loading aid to help guide the part 20 into the chuck when manually clamping/loading. Air or pressurized oil is supplied to the piston area through a rotary coupling, air tube/passageway, and internal drillings. For example, FIGS. 3-6 show an air passageway 17, which splits into plural passageways before entering the area of the housing 3 near the piston 2. Upon supplying air pressure, piston 2 moves forward causing the jaws 5 to pivot and clamp the part. Forward movement of piston 2 that engages jaws 5, further places a radially-inward-directed force on tabs 30. Such force causes tabs 30 to deflect radially inward to squeeze extension 4 which, in turn grips the workpiece 20 at a proximal end. Accordingly, it will be appreciated that engagement of piston 2 with jaws 5 (which further clamp workpiece 20) creates a closed force loop (illustrated at 100). The force loop provides that workpiece 20 is gripped at two locations (by the jaws 5 and by tabs 30). The force loop further provides that the grip at one grip location cannot be loosened without imparting greater grip force at the second grip location. An illustration of such a force loop is provided in FIGS. 10A and 10B, which is directed at a second embodiment mandrel 1' that uses the same jaws 5 and piston 20.

For parts that are required to protrude from the chuck, an auxiliary center support 22 can be used. To unclamp the work part, air supply to the chuck is shut off. With the air shut off, piston return springs 6 return piston 2 to its home position, and jaw return springs 10 pivot the jaws back into their home position.

A chuck mounted dressing disk may be used for wheel dressing. During chuck set-up, jaw inserts 9 are adjusted for required concentricity using jaw insert adjusting screws 7 and appropriate dial (or digital) indicator. This chuck can be used for precision grinding, turning, or whenever precise clamping of long and slender parts is required.

As previously noted, FIGS. 10A and 10B, shows a second embodiment mandrel 1' that uses the same jaws 5 and piston 2. Mandrel 1' installs into a grinding machine work head via a Morese Taper. Mandrel 1' includes holes in a flange and is bolted to a face of a machine work head spindle. It should be appreciated that FIG. 10A is not a pure cross-section, but rather as shown on FIG. 10B, is a cross section that changes section at the mid-line of mandrel 1'(10A-10A). This change in section is provided such that multiple jaws 5 are shown. Of course, there are actually three jaws 5 and all jaws 5 participate in the force loop. Again, the force loop provides that workpiece 20 is gripped at two locations (by the jaws 5 and by tabs 30). The force loop further provides that the grip at one grip location cannot be loosened without imparting greater grip force at the second grip location. Still further, when engaged, tabs 30 include inner and outer surfaces that are both applying forces that cause gripping of work piece 20. Inner surfaces of tabs 30 apply force to extension 4 which translates to grip work piece 20. Outer surfaces of tabs 30 apply force to jaws 5 which are urged to pivot about pivot axis 11 such that jaw insert 9 is urged into and exerts force on workpiece 20.

Mandrel 1' differs from mandrel 1 in the nature of the disengagement of piston 2 and the release of workpiece 20. As shown in FIGS. 10A and B, springs 40 are included that bias piston 2 to an engaged position. Springs 40 are crafted to provide enough force on piston 2 to cause piston 2 to remain in the engaged position absent pneumatic or hydraulic pressure acting thereon. Accordingly, in one embodiment, springs 40 are matched with springs 6 and/or 10 such that regardless of the position of piston 2, piston 2 is held in such position absent the application of additional force.

FIGS. 11A and 11B show hydraulic/pneumatic pathways 44, 46 and pistons 42 that provide additional force to move piston 2 between engaged and disengaged positions. Like FIGS. 10A and 10B, FIG. 11A is a cross-section that changes section at its midpoint (11A-11A). This change in section allows for multiple fluid pathways to be illustrated. Pathway 44 operates similarly to previously discussed passageway 17 such that fluid supplied thereto causes engagement movement of piston 2. Pathway 46 leads to pistons 42. In the present embodiment, there are three pistons 42 positioned to selectively engage piston 2. When pressurized fluid is supplied to pathways 46 and to pistons 42, pistons 42 extend to urge piston 2 to a disengaged position.

While an exemplary embodiment in accordance with the claimed invention has been shown and described, it is understood that the invention is not limited thereto. The present invention may be changed, modified and further applied by those skilled in the art. Therefore, this invention is not limited to the detail shown and described previously, but also includes all such changes and modifications within the scope of the following claims and their equivalents.

The invention claimed is:

1. A chuck assembly, comprising:
   a mandrel including an extension formed on the mandrel and sized and shaped to hold a workpiece;
   a housing coupled to the mandrel; and
   a piston disposed within the housing and including a bore receiving the extension, the piston mounted for supported movement on the extension toward the mandrel to first position providing for insertion and removal of the workpiece to and from the extension, and away from the mandrel to a second position causing gripping force to be applied to the workpiece in at least two locations that are spaced longitudinally along the workpiece to inhibit relative movement between the mandrel and the workpiece.

2. The assembly of claim 1, further including a set of jaws mounted for pivotal movement, wherein movement of said piston causes pivotal movement of said set of jaws; where the piston includes a tapered portion to apply a driving force to at least one jaw of said set of jaws.

3. The assembly of claim 2, wherein said tapered portion is frusto-conically shaped.

4. The assembly of claim 2, wherein the second position causes the set of jaws to exert a gripping force on the workpiece.

5. The assembly of claim 4, wherein the second position further causes the piston to exert a gripping force on the extension.

6. The assembly of claim 5, wherein the piston includes a plurality of tabs that deflect under load, the second position causing the plurality of tabs to deflect to exert the gripping force on the extension.

7. The assembly of claim 1, wherein the second position provides that the force being applied to workpiece at one of the plurality of locations cannot be lessened without increasing force being applied to the workpiece at a second of the plurality of locations.

8. The assembly of claim 1, further comprising a first passageway fluidly connected to a chamber including the piston, and said piston being urged to the first position in response to increasing pressure in the first passageway.

9. The assembly of claim 8, further comprising a second passageway fluidly connected to the chamber including the piston, and the piston being urged to the first position in response to increasing pressure in the second passageway.

10. An assembly for holding a workpiece, comprising:
    a mandrel including an extension configured to grip an end of the workpiece;
    a piston including a bore receiving the extension, the piston mounted for supported reciprocal movement on the extension, the piston including plurality of tabs having internal and external surfaces, the tabs being able to deflect to bring the internal surfaces into engagement with the extension; and a set of jaws mounted for pivotal movement, each jaw of the set of jaws including a surface positioned to receive force exerted by the external surfaces of the piston, wherein movement of said piston exerts force via the external surfaces of the piston and causes pivotal movement of said set of jaws.

11. The assembly of claim 10, further including a housing including the piston and the set of jaws, the mandrel connected to the housing and including a passageway fluidly connected to an interior of the housing, wherein said piston movement is based on an amount of fluid pressure in the passageway.

12. The assembly of claim 10, wherein the piston includes a frusto-conincally shaped section.

13. The assembly of claim 12, wherein the tabs are included in the frusto-conically shaped section.

14. The assembly of claim 10, wherein the piston includes circumferential gaps that permit deflection of the tabs.

15. An assembly for holding a workpiece, comprising:
a mandrel including an extension;
a piston including a plurality of tabs cooperating to define a bore receiving the extension, the piston mounted for supported reciprocal movement on and relative to the extension; and
a set of jaws mounted for pivotal movement, wherein movement of said piston causes a portion of the piston to urge, through driven abutment, a portion of each of the set of jaws away from the extension, thereby causing pivotal movement of said set of jaws, wherein each jaw of the set of jaws includes a clamping surface operable to frictionally engage a workpiece placed within the assembly, pivotal movement of said set of jaws altering an angle assumed by the clamping surface.

16. The assembly of claim 15, wherein the angle assumed by the clamping surface is an angle assumed by the clamping surface relative to a surface of the workpiece that is engaged by the clamping surface.

17. The assembly of claim 15, wherein altering the angle assumed by the clamping surface causes a first portion of the clamping surface to move a greater distance than a second portion of the clamping surface.

18. The assembly of claim 15, wherein the tabs further include an inner surface that abuts the extension, wherein the movement that causes pivotal movement of the jaws causing frictional engagement with the workpiece also causes the tabs to exert force on the extension.

19. The assembly of claim 18, wherein the force exerted on the extension further exerts force on the workpiece.

20. The assembly of claim 15, wherein the piston further includes at least one circumferential gap that aids in the ability of the tabs to exert force on the extension.

* * * * *